Oct. 24, 1950 L. G. PACENT, JR 2,527,275
WIRE TINNING AND CUTTING MACHINE
Filed Nov. 12, 1947 5 Sheets-Sheet 1

Inventor
Louis G. Pacent Jr.,
By Clinton Schroeder,
Merriam & Hogan, Attys.

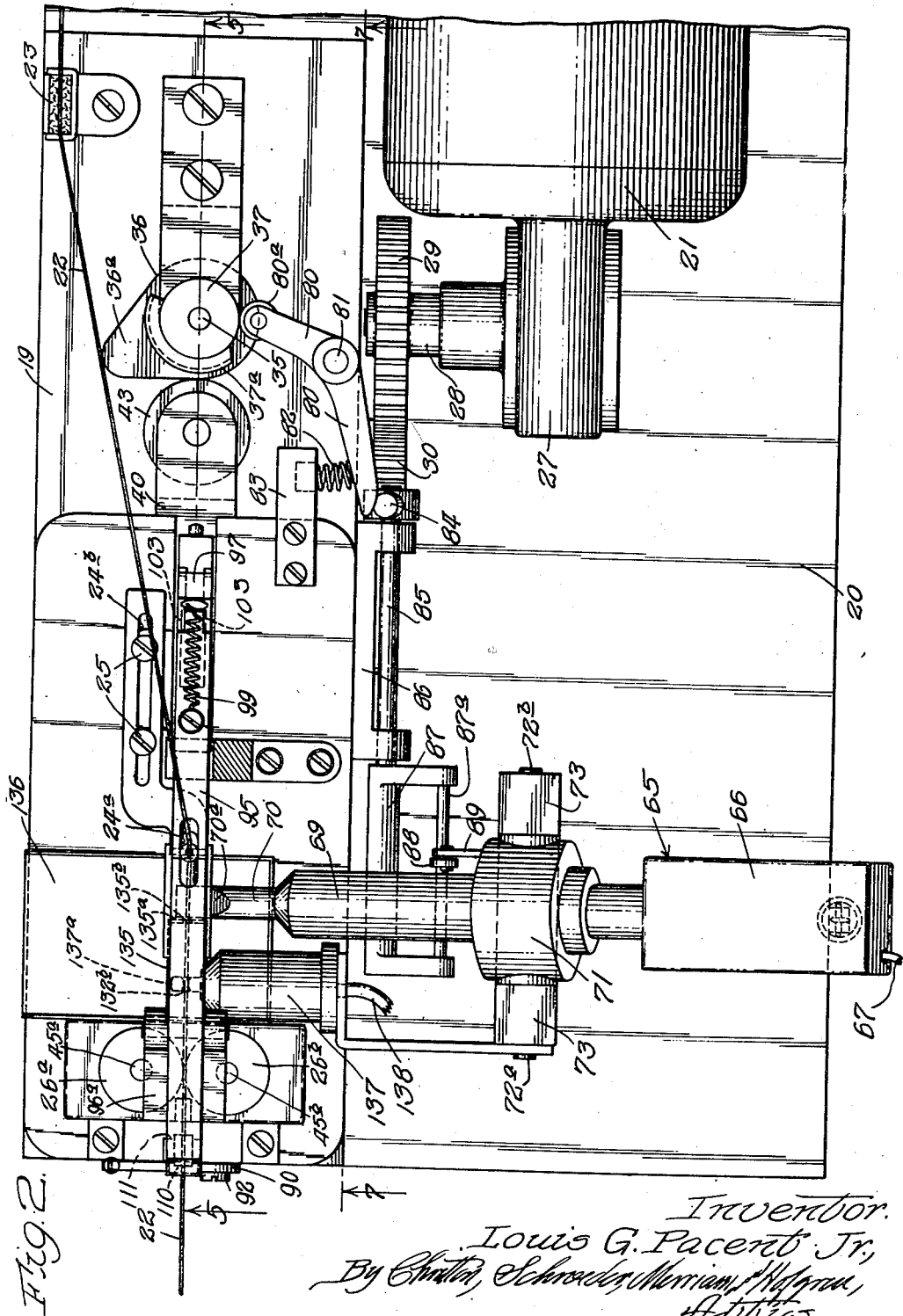

Oct. 24, 1950 — L. G. PACENT, JR — 2,527,275
WIRE TINNING AND CUTTING MACHINE
Filed Nov. 12, 1947 — 5 Sheets-Sheet 3
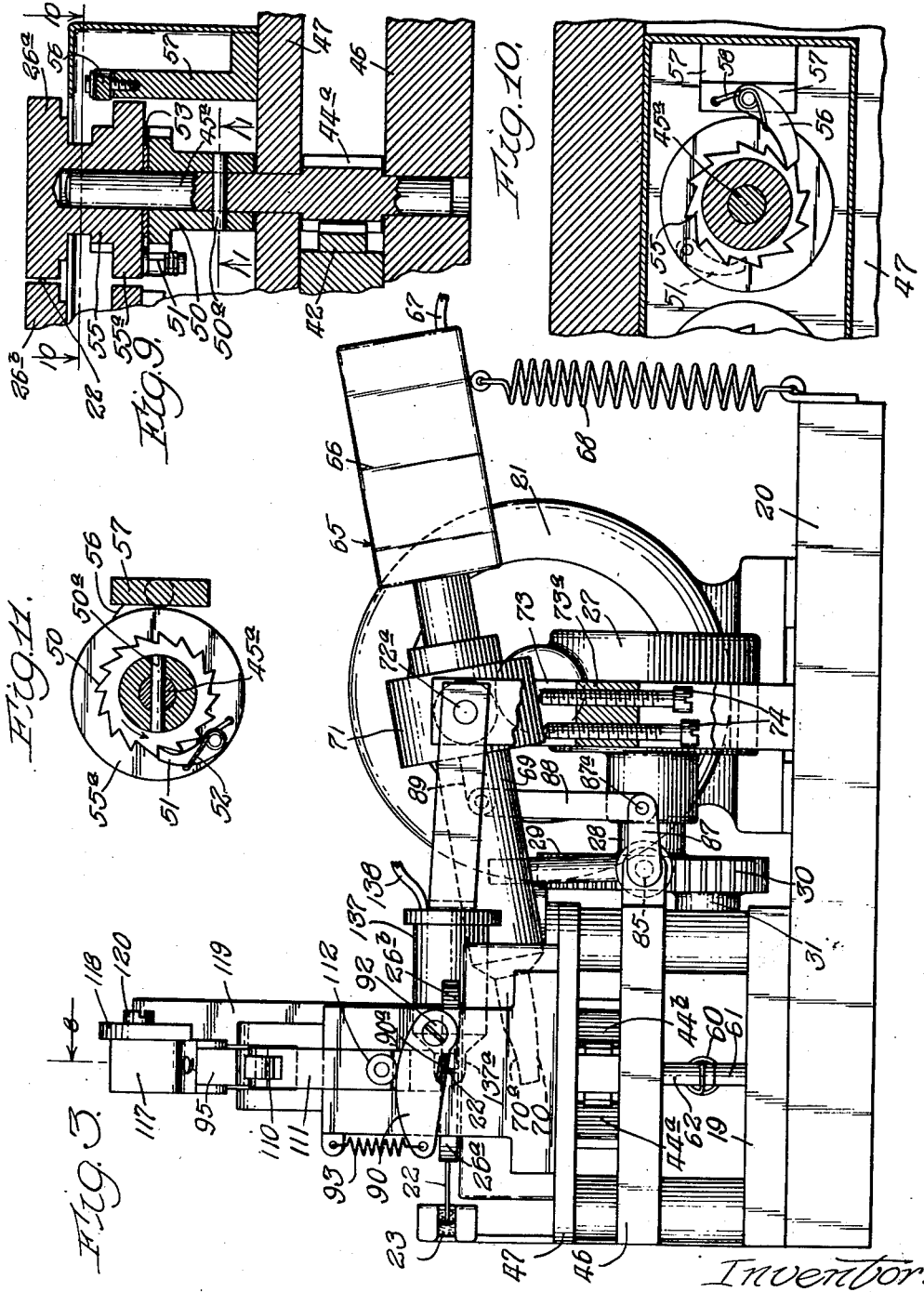

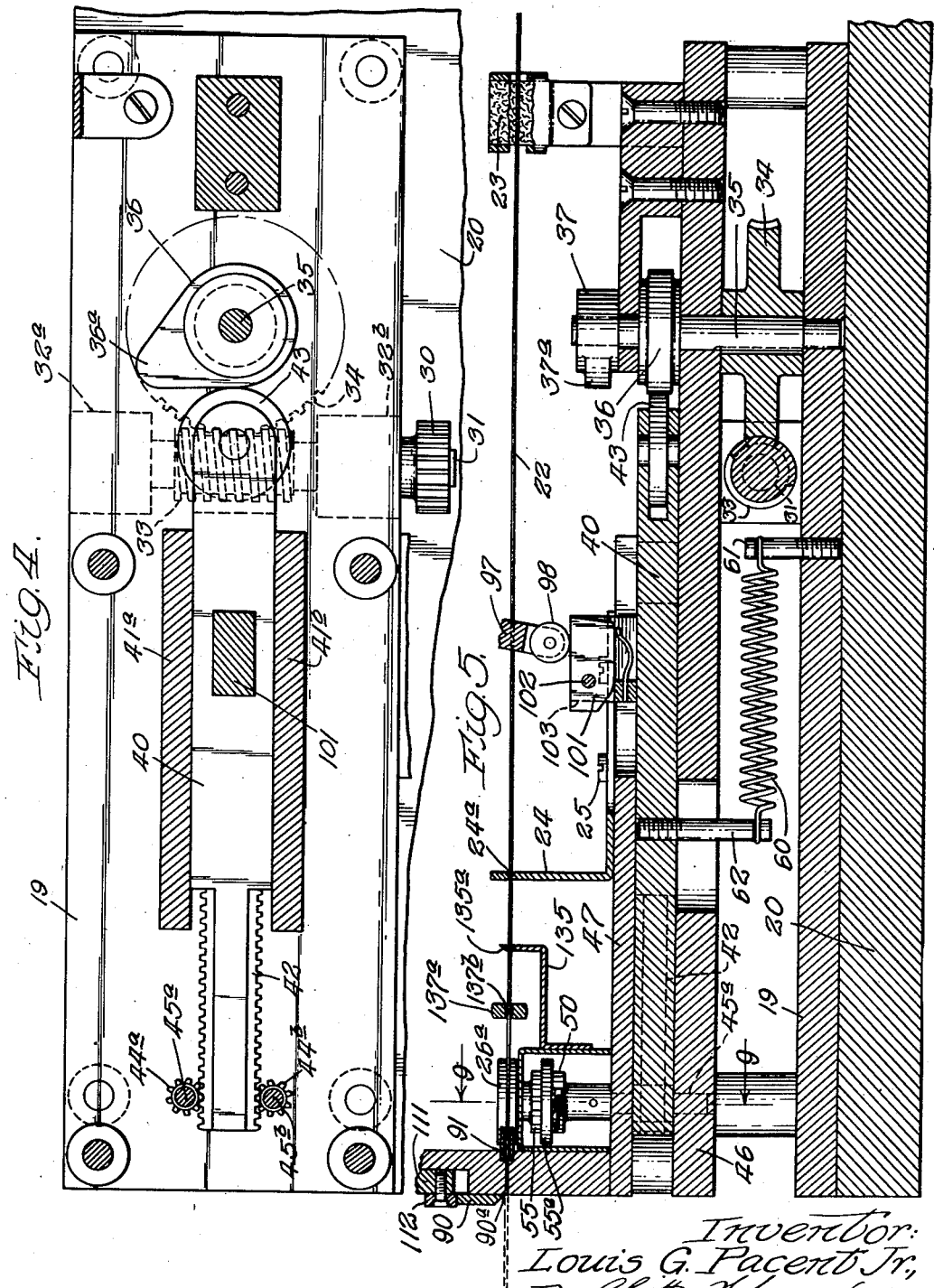

Oct. 24, 1950     L. G. PACENT, JR     2,527,275
WIRE TINNING AND CUTTING MACHINE
Filed Nov. 12, 1947     5 Sheets-Sheet 5
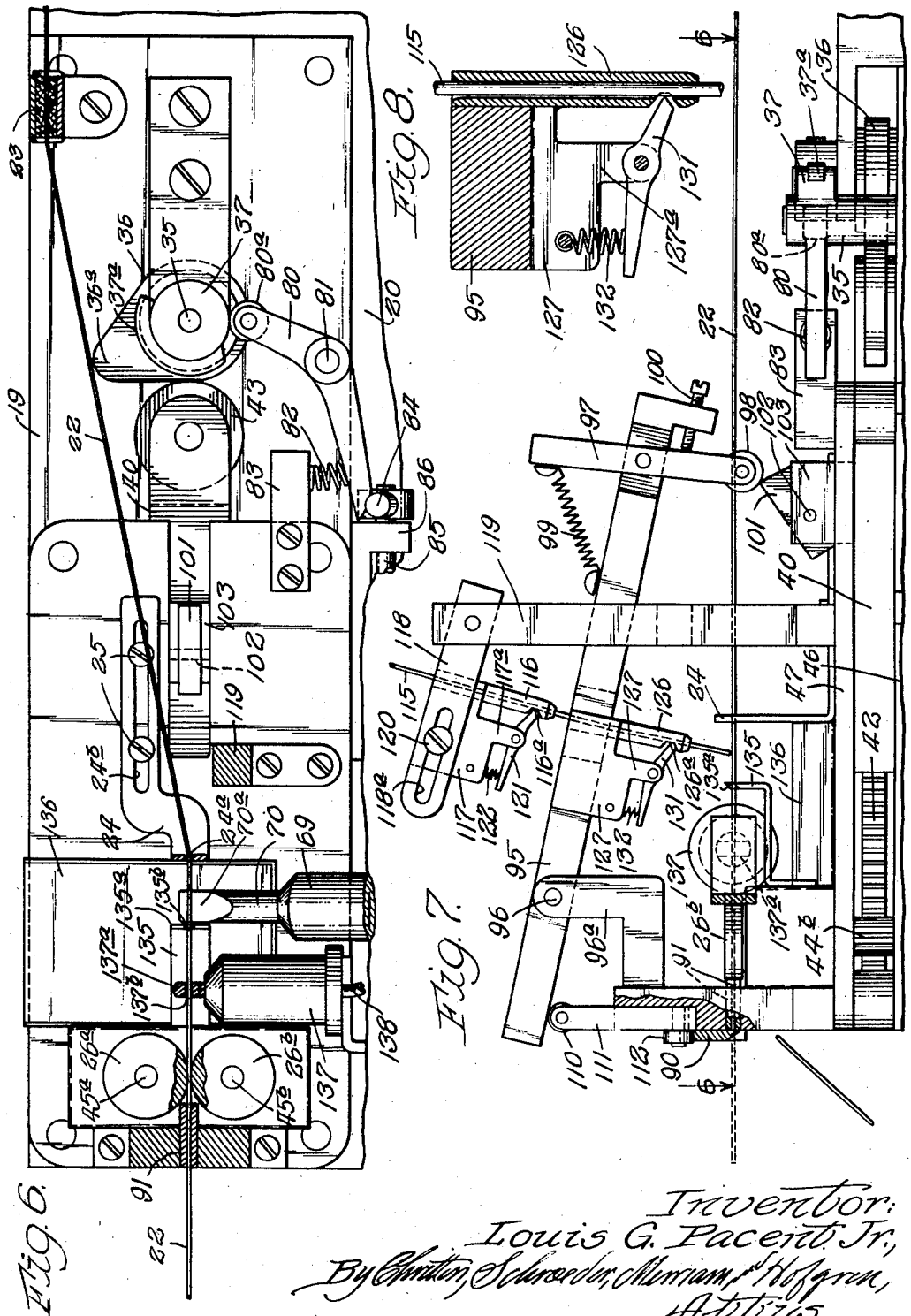
Inventor:
Louis G. Pacent, Jr.

Patented Oct. 24, 1950

2,527,275

UNITED STATES PATENT OFFICE 2,527,275

WIRE-TINNING AND CUTTING MACHINE

Louis G. Pacent, Jr., Chicago, Ill., assignor, by mesne assignments, to Jensen Manufacturing Company, Chicago, Ill., a corporation of Nevada Application November 12, 1947, Serial No. 785,461

5 Claims. (Cl. 91—12.1)

This invention relates to a wire tinning and cutting machine, and more particularly to a machine designed for tinning and cutting lead wires of predetermined length.

One feature of this invention is that it provides a novel wire tinning and cutting machine; another feature of this invention is that it provides improved apparatus for tinning spaced portions of a wire and for cutting said wire into predetermined lengths; a further feature of this invention is that the machine mechanisms are so synchronized that the wire is cut adjacent the center of each tinned portion; yet another feature of this invention is that it includes a device for removing surplus solder; still a further feature of this invention is that it includes a heated member for effecting more equal distribution of solder on the tinned portions; and an additional feature of this invention is that it provides a machine adapted to utilize solder and wire directly from conventional commercially obtainable spools of such materials.

Other features and advantages of this invention will be apparent from the following specification and from the drawings in which:

Fig. 2 is a plan view of the machine, partly in horizontal section along the line 2—2 of Fig. 1;

Fig. 3 is a front view of the machine shown in Fig. 1;

Fig. 4 is a horizontal longitudinal section through the machine along the line 4—4 of Fig. 1;

Fig. 5 is a horizontal longitudinal section through the machine along the line 5—5 of Fig. 2;

Fig. 6 is a horizontal longitudinal section through the machine along the line 6—6 of Fig. 7;

Fig. 7 is a fragmentary vertical horizontal section through the machine along the line 7—7 of Fig. 2, with certain apparatus, including the soldering iron, omitted;

Fig. 8 is an enlarged fragmentary section of a portion of the machine taken along the line 8—8 of Fig. 3;

Fig. 9 is a fragmentary vertical section through the machine along the line 9—9 of Fig. 5;

Fig. 10 is a fragmentary horizontal section along the line 10—10 of Fig. 9; and

Fig. 11 is a fragmentary horizontal section along the line 11—11 of Fig. 9.

Figure 1:
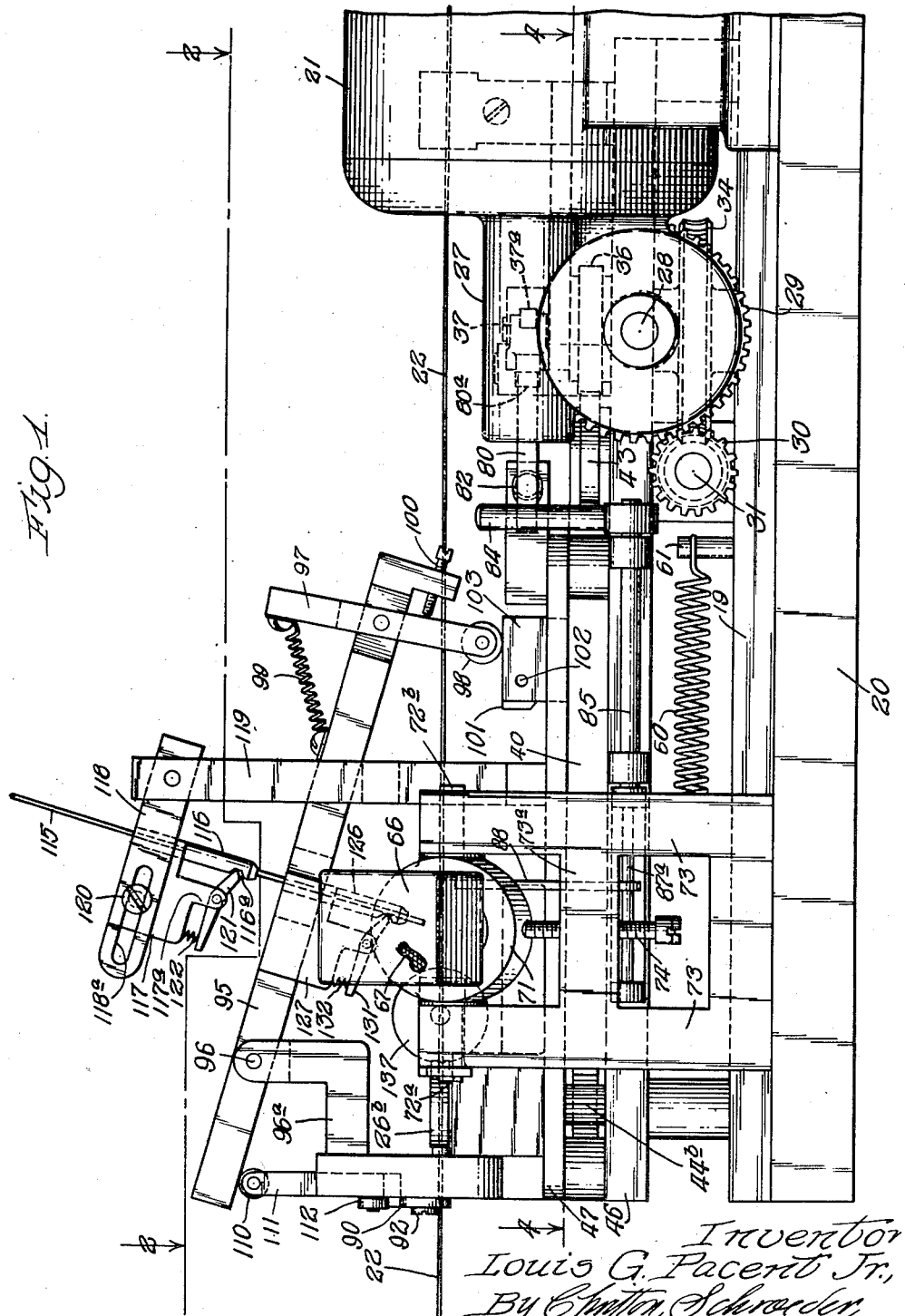
Fig. 1 is a side elevation of a wire tinning and cutting machine constructed in accordance with my invention.

In manufacturing many types of electrical apparatus it is often necessary to use predetermined lengths of wire, and when this wire is to be soldered to a terminal or other connecting point, it is desirable to tin the connecting ends of the wire with the melted solder to prevent the wire strands from fraying, to facilitate the final soldering operation and to insure a better connection.

For example, in manufacturing speakers for radios and other electronic equipment, it is necessary to provide a plurality of short lead wires to provide the connections between the voice coil in the speaker and the connector terminals mounted in the frame. These lead wires normally comprise short lengths of relatively flexible wire, as braided or twisted wire, and in the past it has been necessary to cut these lengths and to tin the ends by hand, a costly and time consuming operation.

I have devised and am herewith disclosing and claiming a novel wire tinning and cutting machine which operates automatically to tin a wire at equally spaced portions and to cut the wire into predetermined lengths, the cutting occurring adjacent the center of each tinned portion so that the finished lead wire is tinned at both its ends. My machine is capable of an output substantially equal to that of four men doing the same operation by hand, and the machine is so designed and constructed and operates so efficiently that at least a half dozen machines may be tended by one operator, thereby greatly improving the efficiency of the production of lead wires and other wires of predetermined length having tinned ends.

Briefly, my machine comprises apparatus for feeding wire through the machine, apparatus for feeding solder to a point closely adjacent to said wire, a source of heat operative intermittently to tin spaced portions of said wire with melted solder and a cutting member operable to cut the wire into predetermined lengths, the operation of said cutting member being synchronized with the feeding of the wire to cut the wire adjacent the center of each tinned portion. In addition, my machine includes a device for removing surplus solder from the wire and a heated member adapted to effect more equal distribution of the solder on the tinned portions. A further advantage of my machine from a commercial standpoint is that it is adapted to utilize solder and wire directly from commercially available spools of these materials, and does not require that either of these materials be removed from the spools and prepared in any special manner for use by the machine.

Referring now to the drawings, the machine has a frame including a base member 19 which is adapted to rest upon a bed 20, as for example a table top, and includes a drive means here illustrated as a motor 21. This motor drives all of the moving parts of the machine, as will more fully appear from the following description.

In operation, a wire 22 which is to be tinned and cut is stored preferably upon a conventionally commercially obtainable spool (not shown) to the rear of and slightly above the machine. The wire is taken from the spool, preferably with the aid of any conventional type guide means to prevent twisting and kinking, as for example a rotatable guide (not shown), and is led through a friction guide device 23 which maintains the wire taut as it progresses through the machine. After leaving the guide 23, the wire is led through an aligning guide 24. This guide is illustrated as an L-shaped bracket having in its upstanding leg an opening 24a through which the wire is fed. The base leg of the member 24 is illustrated as being of dogleg formation to avoid interference with other parts of the machine, and has therein a slot 24b by means of which the guide member may adjustably be secured to the machine frame by means of studs 25. The bracket 24 is so formed that the opening 24a is along the longitudinal center line of the machine, and the wire 22 then extends forwardly along said longitudinal center to the front of the machine.

A pair of wire gripping rollers 26a and 26b are mounted on the machine to rotate about spaced vertical axes, and are adapted to grip the wire 22, these rollers rotating intermittently to cause forward movement of the wire through the machine. Rotation of the rollers 26a and 26b is accomplished by a drive mechanism from the motor 21. The drive shaft of the motor extends into a speed reducing gear housing 27, and from this housing extends a worm driven shaft 28. A gear 29 which is nonrotatably mounted on the shaft 28 engages a pinion 30 which is nonrotatably mounted on a shaft 31, this shaft extending through the machine transverse of the longitudinal center thereof and being rotatable in bearings 32a and 32b (Fig. 4). The shaft 31 carries a worm 33 which engages a worm gear 34 mounted upon a vertical shaft 35 (see Fig. 5) carrying two cams 36 and 37, these cams rotating continuously about the axis of the shaft 35.

A rack block 40 is slidable in ways 41a and 41b, said block carrying at its forward end a rack 42 and carrying at its rear end a roller 43. As the cam 36 rotates, its cam shoulder 36a actuates the block 40 through the roller 43 to move the block forwardly in the ways 41a and 41b. This forward movement rotates a pair of pinions 44a and 44b which engage the teeth of rack 42, these pinions being respectively pinned to shafts 45a and 45b which are rotatably carried in horizontal plates 46 and 47. A ratchet wheel 50 is pinned to the shaft 45b by means of a pin 50a, this wheel cooperating with a pawl 51 which is spring pressed against the ratchet teeth by a spring 52.

A spacing disk 53 separates the ratchet wheel 50 from another ratchet wheel 55 which is rotatable with respect to the shaft 45a and which carries (here shown as integral therewith) the wire gripping roller 26a. The ratchet wheel 55 has a lower disk portion 55a which carries the pawl 51 to lock the ratchet wheel 55 to the ratchet wheel 50 for movement in one direction. A cooperating pawl 56 is mounted on a bracket 57 and is urged into engagement with the teeth of ratchet wheel 55 by means of a spring 58. A similar pawl and ratchet arrangement is mounted on the shaft 45b which is rotated by the pinion 44b, and together these mechanisms comprise a one way drive for the rollers 26a and 26b. Referring to Fig. 9, when the rack 42 moves forwardly the pinion 44a rotates (counter-clockwise as the parts appear in Fig. 11), and the shaft 45a and the ratchet wheel 50 also rotate. The pawl 51 which is carried by the disk 55a on the ratchet wheel 55 engages one of the teeth of the ratchet wheel 50 so that the ratchet wheel 55 and the roller 26a rotate. Since the roller 26b is driven in the same manner, the wire 22 is fed forwardly through the machine.

As the actuating roller 43 leaves the cam shoulder 36a forward movement of the block 40 and the rack 42 ceases, and the block 40 is moved rearwardly by means of a spring 60 which is carried between a pin 61 mounted on the machine base 19 and a pin 62 mounted on the block 40. During this rearward movement of the block the pawl 51 slips over the teeth of the ratchet wheel 50 so that rotation of the shaft 45a is not imparted to the ratchet wheel 55 or the roller 26a, and the pawl 56 engages one of the teeth of ratchet wheel 55 so that reverse rotation of the rollers 26a and 26b is prevented. Since there is only one cam shoulder 36a on the cam 36, it will be seen that despite the fact that the cam 36 rotates continuously the wire is fed intermittently.

In order to melt the solder to tin the wire, a source of heat is operative intermittently on the wire. This source of heat is shown in the drawings as a soldering iron designated generally at 65 in Figs. 2 and 3. The iron comprises a handle portion 66 from which extends a heating cord 67, the other end of the cord, of course, being connected to a source of voltage. This cord is shown only fragmentarily since it is conventional. A spring 68 is secured between the handle portion 66 near the rear end thereof and the table 20, this spring constantly urging the handle portion of the iron downwardly toward the table. The iron includes a shank portion 69 which carries a conventional heating element (not shown), and from which extends a soldering tip 70. The soldering tip has a recess 70a in its soldering surface for a purpose which will hereafter appear. The shank 69 of the iron is mounted in a supporting ring member 71 from which extend oppositely disposed pins 72a and 72b, these pins being journaled in a yoke 73 so that the iron is pivotal about the axis of the pins 72a and 72b, the spring 68 constantly urging the tip 70 of the iron upwards. A block 73a on the yoke 73 is threaded to receive adjusting studs 74, these studs determining the limits of pivotal movement of the iron.

The cam 37 has a cam shoulder 37a which during a portion of each cycle of rotation of the cam is adapted to actuate a pivotally mounted operating member 80. This member is pivoted on a stud 81, and carries at one end a roller 80a adapted to engage the cam 37. A spring 82 abuts the member 80 adjacent its other end and reacts against a bracket 83 on the machine frame to urge the roller 80a against the face of the cam 37. The last mentioned end of the member 80 cooperates with an operating rod 84 which is nonrotatably mounted on and extends at right angles to another operating rod 85 which runs forwardly parallel with the longitudinal center of the machine. This rod is rotatably journaled in a bearing bracket 86, and one end of the rod is secured to a yoke actuating member 87. A cross member 87a on said yoke carries a link 88, the other end of this link being pivoted to a stud 89 which extends alongside the shank portion 69 of the iron and is affixed to the stud 72b.

In the operation of the machine when the roller 80a rides up on the cam shoulder 37a the member 80 pivots clockwise (in Fig. 2) about the stud 81, allowing the member 84 to rise, and the actuating member 85 to rotate counterclockwise (in Fig. 3) so that the link 88 is raised, permitting the spring 68 to pivot the iron around the studs 72 to bring the soldering tip 70 up to a point in contact with or adjacent the wire 22. Then when rotation of the cam 37 moves the roller 80a off the raised cam shoulder 37a, the member 80 pivots counterclockwise (in Fig. 2), causing the member 85 to turn clockwise (in Fig. 3) so that the link 88 pulls the iron back down to the position of Fig. 3.

As pointed out earlier, the machine includes a cutting member operable to cut the wire to predetermined lengths. This is the blade 90 (Fig. 3) having a recessed cutting edge 90a. As may be seen in Figs. 3 and 5, after the wire 22 leaves the feed rollers 26 it is fed through a die 91 to a point immediately below the cutting edge 90a of the blade 90. This blade is pivoted on the machine frame by a stud 92, and the other end of the blade is urged to an upper inoperative position by means of a spring 93.

The movable blade 90 is operated by mechanism illustrated best in Fig. 7. As may be seen in said figure, an actuating member 95 is pivoted near its front end on a pin 96 to an L-shaped bracket 96a which extends rearwardly from the front of the machine frame. The other end of the member 95 pivotally carries an actuating rod 97, this rod extending in a vertical direction and carrying at its lower end a roller 98. A spring 99 acts to urge the upper end of the rod forwardly, this movement being limited and the angular position of the rod being adjustable by means of a set screw 100. The roller 98 rides up on the upper surface of a block 101 which is carried on the top of the sliding block 40. The block 101 is pivotally mounted on a stud 102 journaled in a pair of supporting brackets 103 which extend upwardly from the sliding block. As may best be seen in Fig. 5, the lower forward portion of the block 101 is chamfered or beveled, and the lower rear portion of said block is urged upward by a spring 104, the force of this spring urging the block to pivot in a counterclockwise direction around the stud 102. As may be seen in Fig. 5, the roller 98 normally prevents this pivotal movement. However, when the sliding block 40 moves forward in the manner earlier described, the block 101 is carried back away from the roller 98, and the sliding block 101 pivots to the position illustrated in Fig. 7. When the sliding block 40 moves rearwardly to its starting position, the roller 98 rides up on the slanting rear surface of the block 101, causing the member 95 to pivot about the stud 96. Obviously, when the roller 98 rides on the block 101 to a point slightly beyond that shown in Fig. 7, the roller will overcome the force of the spring 104 and cause the block to assume the position of Fig. 5.

As the member 95 pivots, its forward end is depressed, pushing down on a roller 110 carried by an arm 111. Another roller 112 is carried by the lower end of the arm 111 and rests against the upper surface of the blade 90 so that said blade is caused to pivot about the stud 92 and the cutting edge 90a is brought down to cut the wire. Since both the cutting action and the wire feeding movement are functions of the same movement of the cam 36, the operation of the cutting member is synchronized with the feeding of the wire so that a predetermined length of wire is cut each time, and since the cutting action occurs on the back stroke of the sliding block 40, the blade operates alternately with the forward feeding movement. By properly arranging the distance the wire travels after it has been tinned, I am able to arrange the apparatus so that the wire is cut adjacent the center of each portion which has been tinned as the wire progresses through the machine.

In order to tin wire, it is of course necessary to feed a supply of solder into the machine. Figs. 1, 7 and 8 show the solder feeding apparatus, this apparatus being operable as a function of the operation of the cutting mechanism.

Solder 115, preferably of the rosin core type, is fed to the machine from a supply which may comprise a conventional commercially obtainable spool which may be suspended above the machine. The solder is fed down through a holding device which comprises a feeding tube 116 having a longitudinal opening 116a therethrough. The tube 116 is carried by a bracket 117 which is mounted on an arm 118, this arm being mounted on another arm 119 extending up from the frame of the machine. As illustrated in Figs. 1 and 7, the arm 118 is slotted at 118a and the bracket 117 is adjustable over the length of this slot by means of a set screw 120, the purpose of this arrangement being to provide an adjustment so that the solder may be made to travel in substantially a straight path.

A tongue 117a on the bracket 117 carries a pawl 121, the pawl being pivotal and having a spring 122 urging its operating end upwardly toward the arm 118. As the solder is fed through the tube 116, the operating end of the pawl 121 slips. However, in the event the solder attempts to reverse its movement back out of the tube 116, the operating end of the pawl bites into the solder and prevents this reverse movement.

Below the solder holding apparatus above described is the solder feeding mechanism proper, this mechanism comprising an arrangement similar to the holding mechanism just described but operating in the reversed manner. That is, as shown best in Fig. 8, a feeding tube 126 extends downwardly from the member 95, and a bracket 127 is mounted on said member 95, a tongue 127a providing a pivotal mounting for a pawl 131, the operating end of said pawl being urged downwardly by a spring 132. The operation is exactly reversed from that described in connection with the solder holding apparatus since the operating tooth of the pawl 131 faces opposite to the operating tooth of the pawl 121. Consequently, when the rear end of the member 95 rises as the roller 98 rides up on the inclined surface of the block 101 at the start of a cutting operation, the holding pawl 121 grips the solder to prevent it from moving backward out of the machine, while the feeding pawl 131 slides over the solder to obtain a new "bite" for the next feeding operation. Then when the member 95 completes its pivoting operation and returns to its normal position, the pawl 131 bites into the solder and feeds the solder from the supply spool to a point adjacent the wire 22, the holding pawl 121 slipping during this operation.

Obviously, as the iron 65 moves up to a point adjacent or in contact with the wire 22, the tip of the solder 115 which is adjacent the wire is melted and solder flows over the wire to tin a portion, preferably of the length of about ⅜ of an inch. In order to improve the efficiency of this tinning operation, I prefer to provide the tip of the iron with the recess 70a which is adapted to contain a pool of liquid solder. With this construction, when the iron comes up to contact the wire, the wire is dipped in the pool of solder to effect tinning around the entire periphery of the wire, and liquid solder is always maintained in the pool since the pool is replenished during each soldering operation as the tip of the solder adjacent the wire 22 melts onto the iron.

Immediately beyond the tinning point, I provide a member 135 having a horizontal edge 135a in the path of the wire, this edge having therein a slot 135b of only slightly greater width than the wire. Since the synchronized cam action causes the wire to move forwardly immediately upon completion of the tinning operation, the passage of the wire through this slot 135b before the solder completely hardens causes surplus solder to be removed from the wire, this surplus falling into a pan 136.

In order to effect more equal distribution of solder on the tinned portions of the wire and further to insure the removal of surplus solder from the wire, I provide a heated member having an opening through which the wire passes. This heated member has a body portion 137 containing a heating coil or other heating element which is energized from an electric cord 138 which extends to a source of voltage. Extending from the body portion 137 is a heated element 137a having an opening 137b in the path of the solder.

In the operation of the machine the wire 22 is fed from a spool or other source of supply through the friction guide 23 and through the guide 24 where it is aligned for the tinning operation. The feeding rollers 26 intermittently move the wire forwardly through the machine, the wire extending from said rollers through the die 91 to be cut by the blade 90. The soldering iron 65 is actuated alternately with the wire feeding operation so that during the time the wire is stopped the tip 70a of the iron moves up adjacent to or in contact with the wire to tin a portion thereof with melted solder which is supplied by the solder feeding mechanism operable as a function of the operation of the cutting member. Since a pool of liquid solder is maintained in the recess 70b on the soldering tip of the iron, a thorough tinning operation is assured. Immediately after the iron has tinned the solder, the rollers 26 move the solder forward through the slot 135b to remove excess solder and through the heated element 137a to again melt the solder on the wire and allow it to distribute itself more equally over the wire surfaces. The tinned portion of wire then passes between the rollers 26 and through the die 91 to be cut off by the blade 90. By properly arranging the range of movement of the various machine components and the distance between various mechanisms I am able to provide an arrangement whereby each tinned portion is cut substantially in the center thereof so that each lead wire is tinned at both ends.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a wire tinning and cutting apparatus for making short lengths of wire, in combination, wire feeding means for moving a longitudinally disposed wire intermittently, a soldering iron mounted transversely of the wire for movement into and out of contact with the wire, means for moving the iron into contact with the wire at the intervals between movements of the wire, solder feeding means for moving a supply of solder into contact with the wire and soldering iron, cutting means periodically engaging the wire beyond the place where the soldering iron contacts it, interconnected actuating means for operating said wire feeding means, soldering iron moving means, solder feeding means and cutting means, driving means common to said interconnected actuating means, and a motor for operating said driving means.

2. In wire tinning and cutting apparatus, in combination, wire feeding means for moving a wire intermittently, a soldering iron mounted transversely of the wire for movement into and out of contact with the wire, means for moving the iron into contact with the wire at the intervals between movements of the wire, solder feeding means for moving a supply of solder into contact with the wire and soldering iron, cutting means periodically engaging the wire beyond the place where the soldering iron contacts it, and means for operating in synchronization said wire feeding means, soldering iron moving means, solder feeding means and cutting means.

3. The structure of claim 2 wherein wiper means is mounted along the pathway of the wire between the soldering iron and the cutting means, said wiper means being provided with a restricted passageway through which the wire passes to remove surplus solder and smooth out the solder thereon.

4. In wire tinning and cutting apparatus, in combination, wire feeding means for moving a wire intermittently, a soldering iron pivotally mounted transversely of the wire for movement into and out of contact with the wire, means for moving the iron into contact with the wire at intervals between movements of the wire, the soldering iron being pivoted below the wire and arranged to swing upwardly into contact with the wire, solder feeding means for moving a supply of solder into contact with the wire and soldering iron, the soldering iron having a recessed portion where it contacts the wire to support the wire in a pool of liquid solder received from said solder feeding means, interconnected actuating means for operating said wire feeding means, soldering iron moving means, solder feeding means and cutting means, and driving means common to said interconnected actuating means.

5. In wire tinning and cutting apparatus, in combination, wire feeding means for moving a wire intermittently, a heat applying device mounted transversely of the wire, means for intermittently applying heat from said device to the wire, said heat applying device being actuated at the intervals between movements of the wire, solder feeding means for moving a supply of solder into proximity with the wire and heat applying means, cutting means periodically engaging the wire beyond the place where the heat applying means contacts it, interconnected actuating means for operating said wire feeding means, heat applying means, solder feeding means and cutting means, and driving means common to said actuating means.

LOUIS G. PACENT, Jr.

REFERENCES CITED

The following references are of record in the file of this patent:

UNITED STATES PATENTS

| Number | Name | Date |
| --- | --- | --- |
| Re. 20,049 | Schueler | July 28, 1936 |
| 915,480 | Roberts | Mar. 16, 1909 |
| 1,749,939 | Heller | Mar. 11, 1930 |
| 1,930,219 | Zimber | Oct. 10, 1933 |
| 1,969,517 | Malloy | Aug. 7, 1934 |
| 2,113,674 | Brickman et al. | Apr. 12, 1938 |
| 2,170,784 | Donovan et al. | Aug. 22, 1939 |
| 2,251,434 | Weiss et al. | Aug. 5, 1941 |
| 2,356,837 | Ehrat et al. | Aug. 29, 1944 |
| 2,483,424 | Martines | Oct. 4, 1949 |